United States Patent
Ellis-Monaghan et al.

(10) Patent No.: US 8,903,210 B2
(45) Date of Patent: Dec. 2, 2014

(54) VERTICAL BEND WAVEGUIDE COUPLER FOR PHOTONICS APPLICATIONS

(71) Applicant: International Business Machines Corporation, Armonk, NY (US)

(72) Inventors: John J. Ellis-Monaghan, Grand Isle, VT (US); Jeffrey P. Gambino, Westford, VT (US); Mark D. Jaffe, Shelburne, VT (US); Kirk D. Peterson, Jericho, VT (US); Jed H. Rankin, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/872,385

(22) Filed: Apr. 29, 2013

(65) Prior Publication Data

US 2014/0321801 A1   Oct. 30, 2014

(51) Int. Cl.
*G02B 6/26* (2006.01)
*G02B 6/12* (2006.01)
*G02B 6/13* (2006.01)
*G02B 6/35* (2006.01)

(52) U.S. Cl.
CPC .. *G02B 6/12* (2013.01); *G02B 6/13* (2013.01); *G02B 6/262* (2013.01); *G02B 6/3504* (2013.01); *G02B 2006/12119* (2013.01)
USPC ................. 385/43; 385/32; 385/42

(58) Field of Classification Search
CPC .............. G02B 6/3504; G02B 2006/12119
USPC ................................. 385/42, 43, 49
See application file for complete search history.

(56) References Cited

U.S. PATENT DOCUMENTS

| | | | | |
|---|---|---|---|---|
| 3,785,717 | A * | 1/1974 | Croset et al. | 385/132 |
| 3,896,305 | A * | 7/1975 | Ostrowsky et al. | 250/227.24 |
| 5,046,800 | A * | 9/1991 | Blyler et al. | 385/131 |
| 6,813,417 | B2 * | 11/2004 | Oh et al. | 385/43 |
| 6,975,792 | B1 * | 12/2005 | Goldberg et al. | 385/31 |
| 7,068,870 | B2 | 6/2006 | Steinberg et al. | |
| 7,257,295 | B2 * | 8/2007 | Yokouchi | 385/39 |
| 7,310,468 | B2 | 12/2007 | Kittaka et al. | |
| 7,496,254 | B2 | 2/2009 | Miyadera et al. | |
| 8,238,704 | B2 | 8/2012 | Bakir et al. | |
| 2002/0031297 | A1 * | 3/2002 | Forrest et al. | 385/28 |
| 2005/0263686 | A1 * | 12/2005 | Baehr-Jones et al. | 250/227.11 |
| 2011/0170825 | A1 | 7/2011 | Spector et al. | |
| 2012/0141069 | A1 | 6/2012 | Ming-Chang et al. | |
| 2012/0156369 | A1 | 6/2012 | Kim et al. | |
| 2012/0243827 | A1 | 9/2012 | Jeong | |

* cited by examiner

*Primary Examiner* — Charlie Peng
(74) *Attorney, Agent, or Firm* — David Cain; Keivan Razavi

(57) ABSTRACT

An optical waveguide structure may include a dielectric layer having a top surface, an optical waveguide structure, and an optical coupler embedded within the dielectric layer. The optical coupler may have both a substantially vertical portion that couples to the top surface of the dielectric layer and a substantially horizontal portion that couples to the optical waveguide structure. The substantially vertical portion and the substantially horizontal portion are separated by a curved portion.

9 Claims, 9 Drawing Sheets

VERTICAL BEND WAVEGUIDE COUPLER FOR PHOTONICS APPLICATIONS

BACKGROUND a. Field of the Invention

The present invention generally relates to integrated photonic devices, and more particularly to optical coupler devices utilized for coupling optical signals to/from integrated photonic devices.

b. Background of Invention

The use of both photonic devices in high-speed switching and transceiver devices in data communications are but a few examples that highlight the advantages of processing both optical and electrical signals within a single integrated device. For example, an integrated photonic device may include both photonic and CMOS type devices that may be fabricated with a single substrate. However, optical signals may need to be efficiently transmitted to and from the integrated photonic device without enduring significant power loss. Moreover, within the integrated photonic device, optical signals may need to be efficiently coupled to a photonic device (e.g., a photodetector) via an optical waveguide residing within the integrated photonic device.

It may, therefore, be advantageous, among other things, to more efficiently couple optical signals to optical waveguide structures residing within integrated photonic devices.

BRIEF SUMMARY

According to at least one exemplary embodiment, an optical waveguide structure may include a dielectric layer having a top surface, an optical waveguide structure; and an optical coupler embedded within the dielectric layer. The optical coupler may include both a substantially vertical portion that couples to the top surface of the dielectric layer and a substantially horizontal portion that couples to the optical waveguide structure. The substantially vertical portion and the substantially horizontal portion are separated by a curved portion. However, according to some exemplary embodiments, the optical coupler may taper in width from the substantially vertical portion to the substantially horizontal portion. According to other exemplary embodiments, the optical coupler may have a uniform or constant fixed width along the substantially vertical portion, the curved portion, and the substantially horizontal portion.

According to at least one other exemplary embodiment, an embedded optical coupler embedded within a dielectric layer may include a first waveguide region having a first tapered width and being substantially vertical relative to a top surface of the dielectric layer, a second waveguide region having a second tapered width and being substantially horizontal relative to the top surface of the dielectric layer, and a waveguide bend region having a third tapered width located between the first and the second waveguide region. The first waveguide region, the second waveguide region, and the waveguide bend region are embedded within the dielectric layer. The first waveguide region receives an optical signal vertically incident relative to the top surface of the dielectric layer, whereby the optical signal propagates through the first waveguide region to the second waveguide region via the waveguide bend region.

According to at least one other exemplary embodiment, an integrated photonics device may include a dielectric layer having a top surface, and a curved optical coupler having a tapered width embedded within the dielectric layer, whereby the curved optical coupler has a substantially vertical end facet having a first width and a coupling region having a second width. The end facet is coupled to the top surface of dielectric layer and is operable to vertically receive an optical signal. An optical waveguide structure embedded within the dielectric layer may be coupled to the coupling region in a substantially horizontal manner, such that the optical signal propagates within the curved optical coupler and couples to the optical waveguide structure at the coupling region. A photodetector coupled to the optical waveguide structure converts the optical signal to an electrical signal, while a transistor device may be electrically coupled to the photodetector.

According to at least one other exemplary embodiment, a method of forming an optical waveguide structure may include forming a dielectric layer and forming a tapered opening within the dielectric layer, whereby the tapered opening includes a top edge that is substantially coplanar with a top surface of the dielectric layer and a bottom region that exposes a portion of a silicon waveguide structure. A silicon layer is deposited within the tapered opening followed by the silicon layer being etched to form a silicon coupler that extends from the top edge of the tapered opening to the exposed portion of the silicon waveguide structure at the bottom region of the tapered opening. The silicon coupler tapers in width from a first width at the top edge to a narrower second width at the bottom region. A dielectric fill material is then deposited for filling the tapered opening, such that the dielectric fill material covers the formed silicon coupler and is substantially coplanar with the top surface of the dielectric layer. The silicon coupler guides an optical signal received at the top edge to the silicon waveguide structure at the bottom region of the tapered opening.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The following one or more exemplary embodiments describe a vertical bend optical waveguide coupler that is embedded within a dielectric layer of, for example, an integrated photonics device. The vertical bend optical waveguide coupler may receive the optical signals from an external waveguide such as an optical fiber, whereby the vertical bend optical waveguide coupler guides the received optical signals to one or more other waveguide structures that may also be embedded within the integrated photonics device. An integrated photonics device may, for example, include both CMOS type electrical devices such as a field effect transistor (FET) and photonic type devices such as a photodetector device. It may, however, be appreciated that in some implementations, the vertical bend optical waveguide coupler is embedded within a photonics chip that does not include electrical devices such as either CMOS or Bipolar type transistor devices.

Figure 1A:
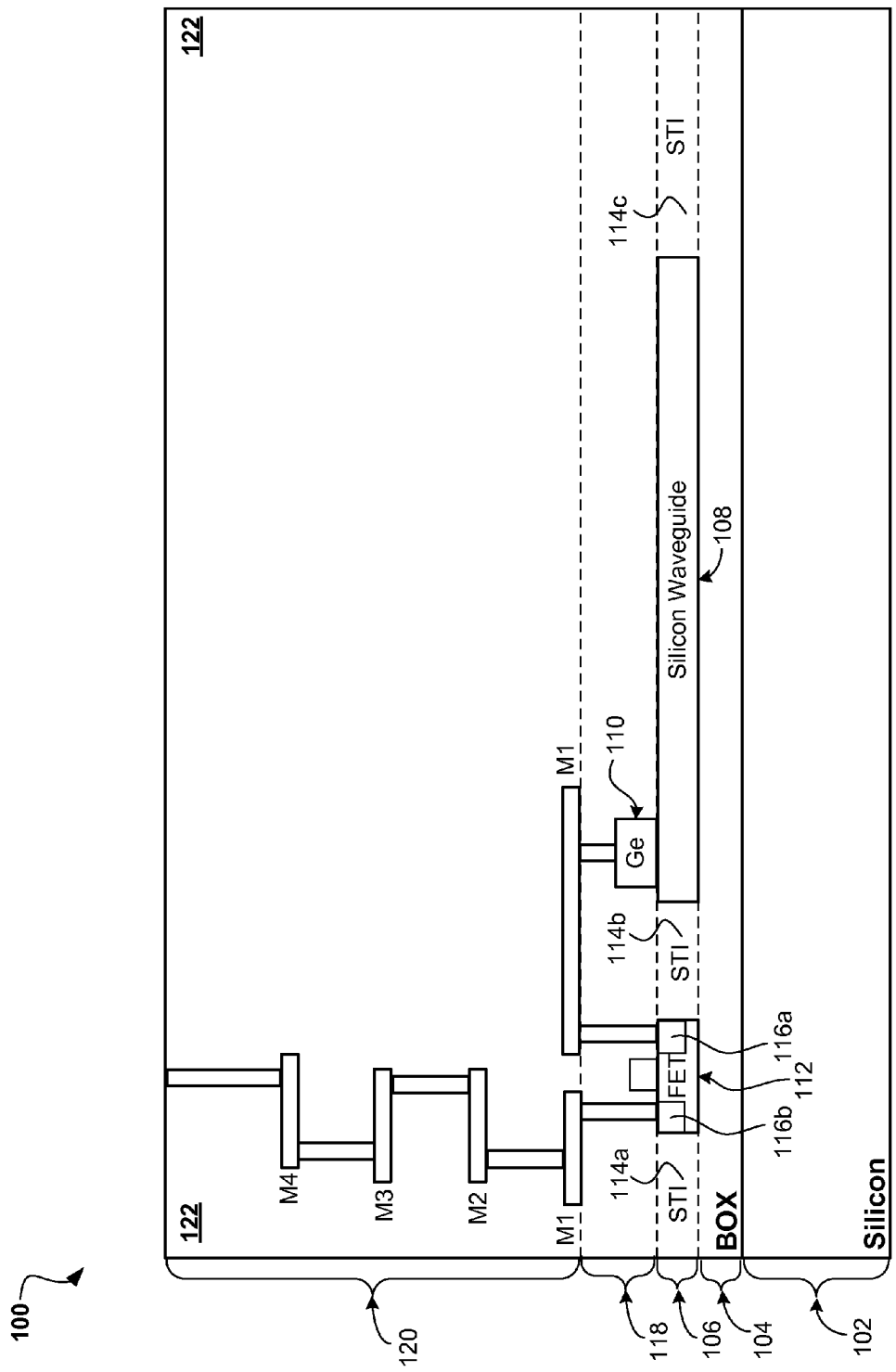
FIGS. 1A-1G are cross-sectional and plan views corresponding to the fabrication of a vertical bend optical waveguide coupler within an integrated photonic semiconductor device structure according to an exemplary embodiment.

FIGS. 1A-1G are cross-sectional and plan views corresponding to the fabrication of a vertical bend optical waveguide coupler within an integrated photonic semiconductor device structure according to one exemplary embodiment. Referring to FIG. 1A, a cross-sectional view of an exemplary embodiment of an integrated photonics device 100 is depicted. Integrated photonics device 100 may include silicon substrate 102, buried oxide (BOX) layer 104, and silicon-on-insulator (SOI) region 106. The SOI region 106 may include a silicon waveguide 108, a germanium (Ge) photodetector 110, and a FET device 112, which is electrically isolated from the waveguide 108 and Ge photodetector 110 by shallow trench isolation region 114b. Shallow trench isolation regions 114a-114c may, for example, be filled with a silicon dioxide ($SiO_2$) insulation material.

As illustrated in FIG. 1A, the silicon waveguide 108 is coupled to the Ge photodetector 110, whereby optical signals guided by the silicon waveguide 108 are directed onto the active region (not shown) of the photodetector 110 for optoelectric conversion. The Ge photodetector 110 may be electrically coupled by a M1 metallization layer to source/drain (S/D) region 116a of the FET device 112. Also, the M1 metallization layer may electrically couple the other source/drain (S/D) region 116b of the FET device 112 to the other metallization layers, as denoted by M2-M4.

Referring to FIG. 1A, a borophosphosilicate (BPSG) insulating material may fill region 118, which is located above SOI region 106. Further, a silicon dioxide ($SiO_2$) insulation material may fill region 120, which is located above region 118. Insulating regions 118 and 120 may collectively form dielectric layer 122, which accordingly provides electrical insulation between the metallization layers (i.e., M1-M4). The dielectric layer 122 may also be referred to as the interlayer dielectric for the metallization layers (i.e., M1-M4).

Figure 1B:
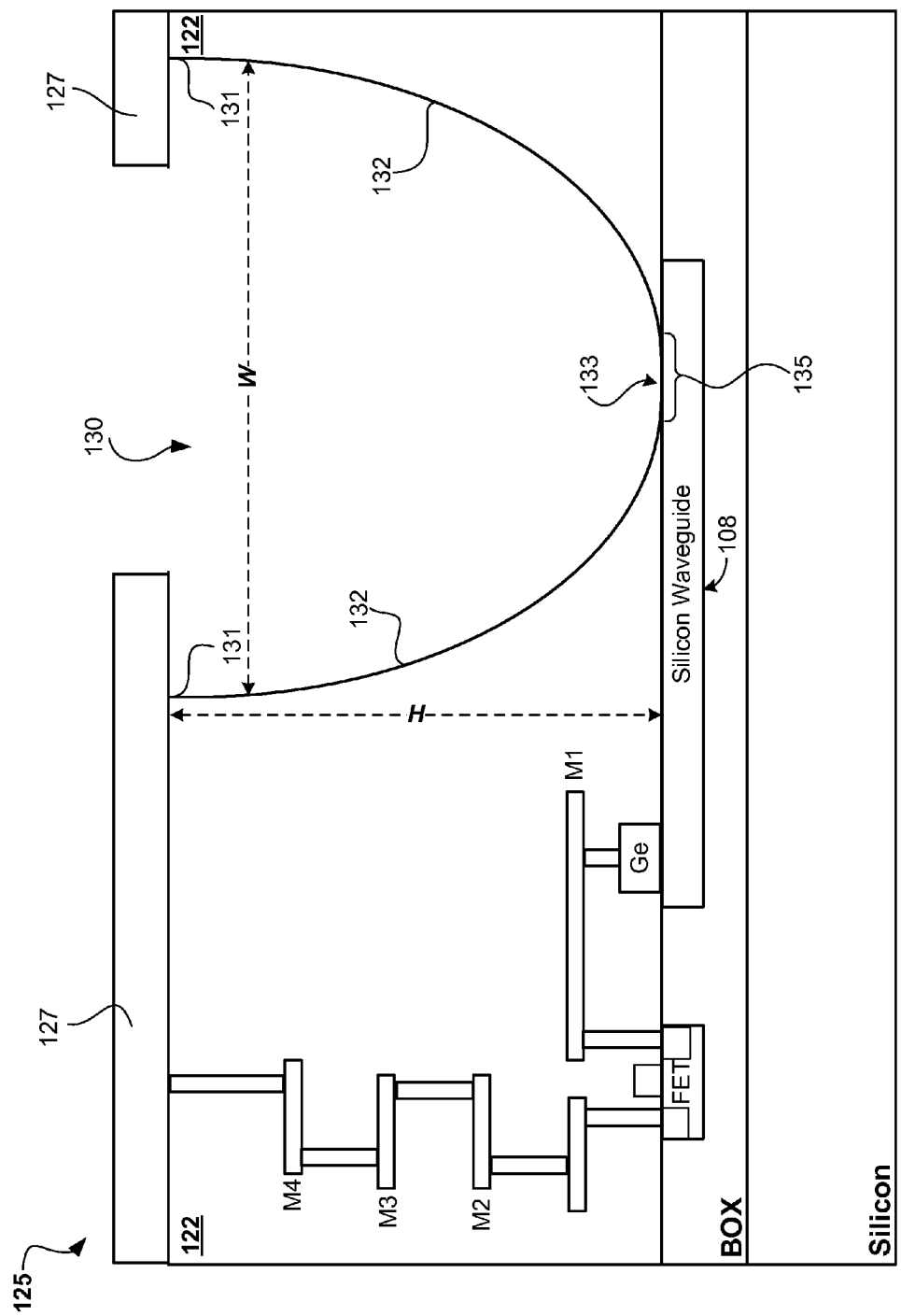

Referring to FIG. 1B, a cross-sectional view of an exemplary embodiment of integrated photonics device 125 is depicted. Integrated photonics device 125 may be formed by photolithographically pattering and wet etching integrated photonics device 100 (FIG. 1A). Accordingly, patterned photoresist layer 127 may be utilized to create a tapered opening 130 within dielectric layer 122 using, for example, a chemical wet etch process. The tapered opening 130 may be formed using the same process used to create via trenches. The wet etch technique may facilitate the rounded sidewalls 132 and profile of the opening 130, which as described in the following paragraphs, are used to fabricate the vertical bend optical waveguide coupler (e.g., FIG. 1G: 140). The opening 130 may have a height H of, from example, about 20 μm, measured between the top edge 131 and bottom region 133 of the tapered opening 130. The opening 130 may also have a width W of, from example, about 20 μm. As illustrated, the bottom region 133 of opening 130 may expose a top surface portion 135 of the silicon waveguide 108.

Figure 1C:
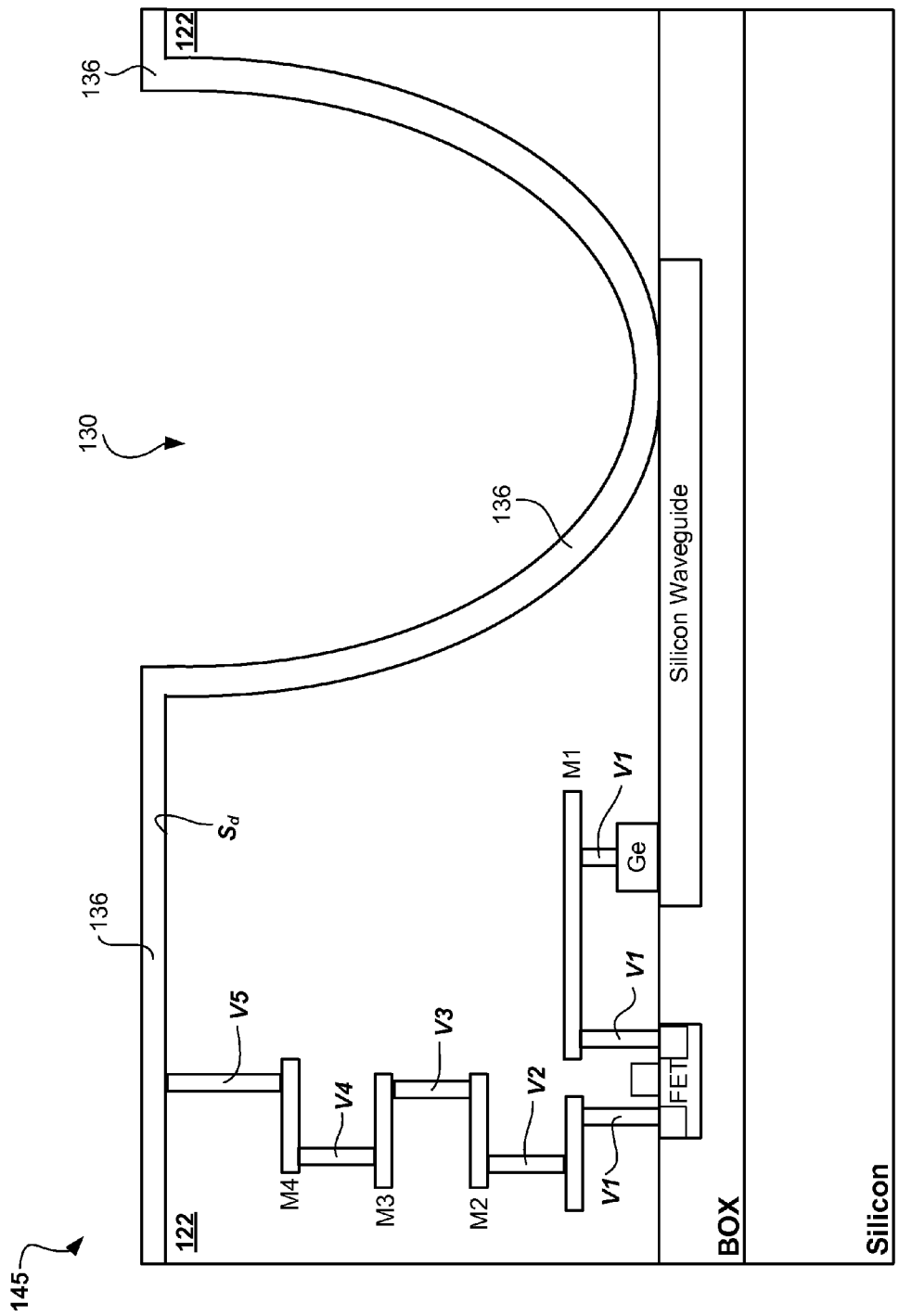

Referring to FIG. 1C, a cross-sectional view of an exemplary embodiment of integrated photonics device 145 is depicted. Integrated photonics device 145 may be formed by removing patterned photoresist layer 127 (FIG. 1B) from integrated photonics device 125 (FIG. 1B) and depositing a conformal layer of polycrystalline silicon 136 both over the top surface $S_d$ of dielectric layer 122 and within opening 130.

The conformal layer of polycrystalline silicon 136 may have a thickness in the range of approximately 1000 Å to about 1 μm. Plasma enhanced chemical vapor deposition (PECVD) or sputter deposition may be used to deposit the conformal layer of polycrystalline silicon 136 over the dielectric layer 122 and within the opening 130. In order to mitigate any damage (e.g., melting, voiding, etc.) to the metallic wiring facilitated by the metallization layers M1-M4 and interconnecting vias V1-V5, the PECVD or sputter deposition processes are carried out at 400° C. of less in the case of aluminum or copper wiring. Alternatively, for example, a low pressure chemical vapor deposition (LPCVD) deposition technique may be utilized to deposit the conformal layer of polycrystalline silicon 136 over the dielectric layer 122 and within the opening 130. However, LPCVD deposition may be more suitable when tungsten wiring is used. This is due to LPCVD deposition occurring at a higher temperature of about 600° C. and tungsten material being more resilient to this higher temperature relative to aluminium or copper wiring.

Figure 1D:
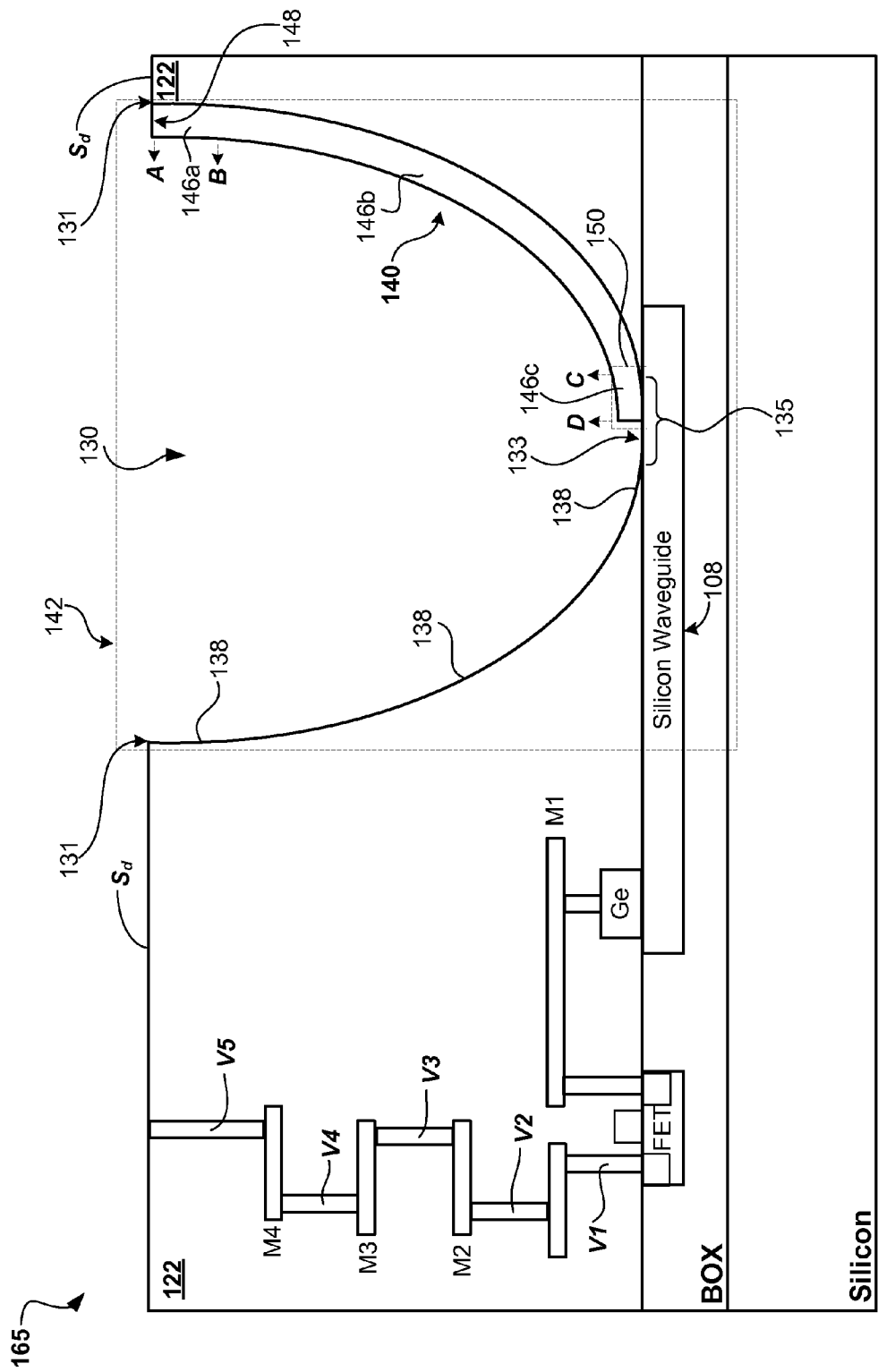
Figure 1D:
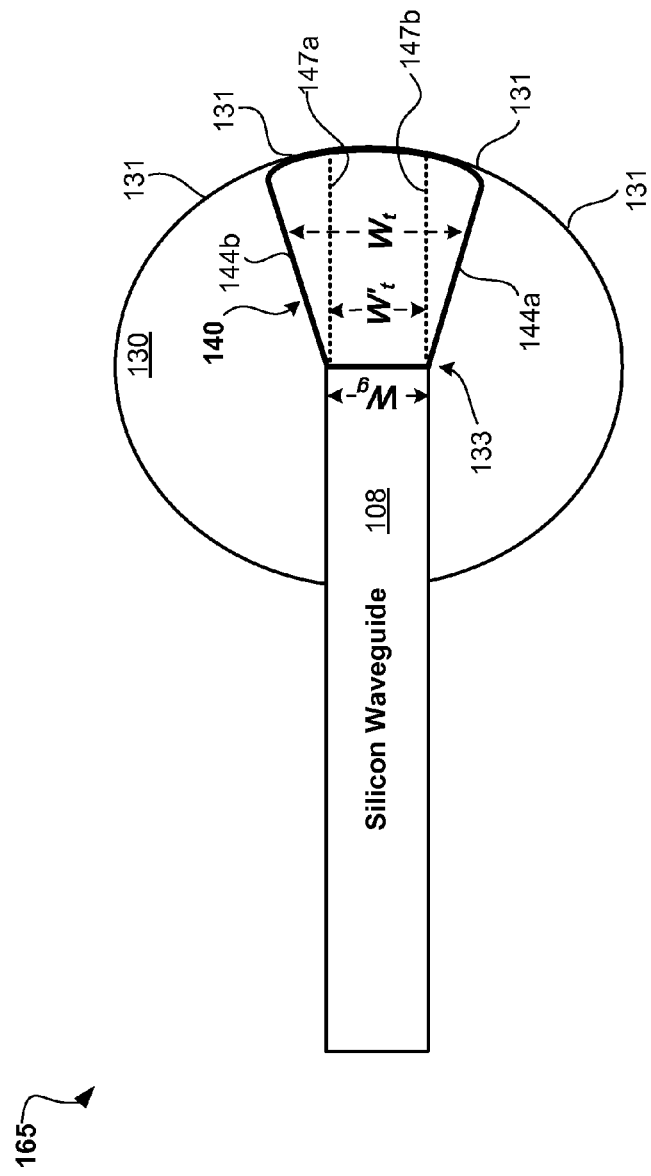

Referring to FIG. 1D, a cross-sectional view of an exemplary embodiment of integrated photonics device 165 is depicted. Integrated photonics device 165 may be formed by etching the conformal layer of polycrystalline silicon 136 (FIG. 1C) from both over the top surface $S_d$ of dielectric layer 122 and from within a portion 138 of opening 130. As illustrated, following a lithographic patterning and etch process (not shown), an optical coupler 140 is formed from the etched layer of polycrystalline silicon 136 (FIG. 1C). Accordingly, the optical coupler 140 may, for example, include a substantially vertical portion 146a located between points A and B (i.e., a first waveguide region), a curved portion 146b located between points B and C (i.e., a waveguide bend region), and a substantially horizontal portion 146c located between points C and D (i.e., a second waveguide region). Thus, optical coupler 140 extends vertically from the top edge 131 of the tapered opening 130 to approximately a horizontal orientation at the bottom region 133 of the tapered opening 130 as a result of the curved profile attributed to tapered opening 130. The curved shape of the optical coupler 140 may, therefore, be varied by changing the tapering dimensionality of opening 130.

The optical coupler 140, in operation, may couple optical signals that are received at the top surface $S_d$ of the dielectric layer 122 to the silicon waveguide 108 adjacent the bottom region 133 of the tapered opening 130. Thus, the optical signals that are received at the top surface $S_d$ of the dielectric layer 122 may be coupled to the end facet 148 of the substantially vertical portion 146a. The coupled optical signals subsequently propagate through the vertical portion 146a, the curved portion 146b, and the horizontal portion 146c to the exposed portion 135 of the silicon waveguide 108.

As depicted, a coupling region 150 may include at least some of the horizontal portion 146c of the optical coupler 140 that optically couples guided optical signals to the silicon waveguide 108. In some implementations, the coupling region 150 may include the entire horizontal portion 146c. In other implementations, the coupling region 150 may include the horizontal portion 146c and at least a portion of the curved portion 146b. The coupling region 150 may, for example, have a length of approximately 1-10 μm, although lesser or greater values may also be contemplated. The coupling region 150 may either directly couple (as shown) to the exposed portion 135 of the silicon waveguide 108, or couple to the exposed portion 135 via the intermediary of other materials or layers (not shown).

Although the optical coupler 140 may be formed from a polycrystalline silicon material, by performing a localized laser anneal process, the polycrystalline structure of the optical coupler 140 may be converted to single crystalline structure. A single crystalline optical coupler 140 may provide less optical signal attenuation relative to a polycrystalline optical coupler 140. However, the laser annealing should be localized to the area of the optical coupler 140 in order to avoid any damage to the wiring M1-M4, V1-V5 as a result of the heat caused by the anneal process.

Referring to FIG. 1D', a plan view of region 142 (FIG. 1D) of integrated photonics device 165 is depicted in order to facilitate the illustration of the tapered width $W_t$ associated with the sides 144a-144b of the optical coupler 140. As depicted in the exemplary embodiment, the tapered width $W_t$ decreases progressively along the substantially vertical portion 146a (FIG. 1D), along the curved portion 146b (FIG. 1D), and finally along the substantially horizontal portion 146c (FIG. 1D). The tapered width $W_t$ of optical coupler 140 is at a maximum in the vicinity of the top edge 131 and at a minimum in the vicinity of the bottom region 133 (FIG. 1D) of the tapered opening 130 (FIG. 1D). The tapering of the width $W_t$ may, among other things, accommodate the differences in size between the optical waveguide (e.g., FIG. 1F: optical fiber 197) inputting the optical signal to the end facet 148 (FIG. 1D) of the optical coupler 140 and the width $W_g$ of the silicon waveguide 108, which is coupled to the substantially horizontal portion 146c (FIG. 1D) of the optical coupler 140.

For example, the tapered width $W_t$ in the vicinity of the top edge 131 of the tapered opening 130 may be approximately the same as that of the core of an optical fiber (e.g., FIG. 1F: fiber core 199) coupling optical signals to the end facet 148 (FIG. 1D) of the optical coupler 140. Also, the tapered width $W_t$ in the vicinity of the bottom region 133 of the opening 130 may have a width that is substantially the same as that of the width $W_g$ of the silicon waveguide 108. The tapering may allow for maximizing the collection of light from the input waveguide (e.g., FIG. 1F: optical fiber 197) while maximizing the delivery of light to the silicon waveguide 108. In an alternative exemplary embodiment, the tapered width $W_t$ in the vicinity of the top edge 131 of the tapered opening 130 may be larger than that of the core of an optical fiber (e.g., FIG. 1F: fiber core 199) coupling optical signals to the end facet 148 (FIG. 1D) of the optical coupler 140. It may, however, be appreciated that the optical coupler 140 may include a substantially uniform width $W'_t$ from the substantially vertical portion 146a (FIG. 1D), along the curved portion 146b (FIG. 1D), to the substantially horizontal portion 146c (FIG. 1D), as indicated by dashed lines 147a and 147b.

Figure 1E:
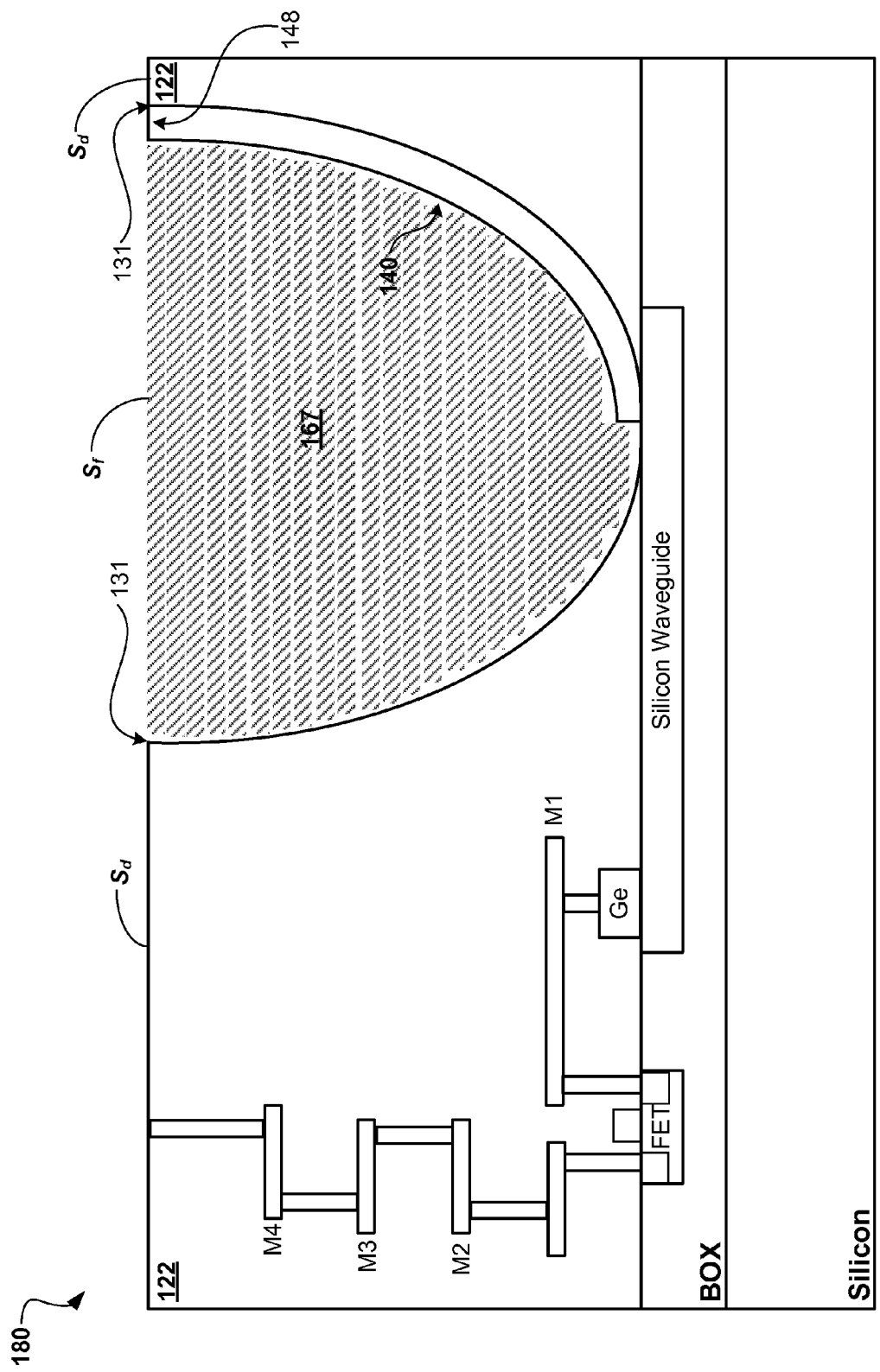

Referring to FIG. 1E, a cross-sectional view of an exemplary embodiment of integrated photonics device 180 is depicted. Integrated photonics device 180 may be formed by depositing an insulating fill material 167 such as silicon dioxide ($SiO_2$) within opening 130 (FIG. 1D) of integrated photonics device 165 (FIG. 1D). The insulating fill material 167 may, for example, be deposited using either PECVD or spin-on-glass (SOG) processes. Upon deposition of the insulating fill material 167, the top surface $S_d$ of the dielectric layer 122 and the top surface $S_f$ of the fill material 167 may be polished using, for example, a chemical mechanical polishing (CMP) process in order to form a planarized top surface. Thus, as depicted, the top surface $S_d$ of the dielectric layer 122, the top surface $S_f$ of the fill material 167, the end facet 148 of the optical coupler 140, and the top edge 131 of opening 130 (FIG. 1D) may all be substantially coplanar.

Figure 1F:
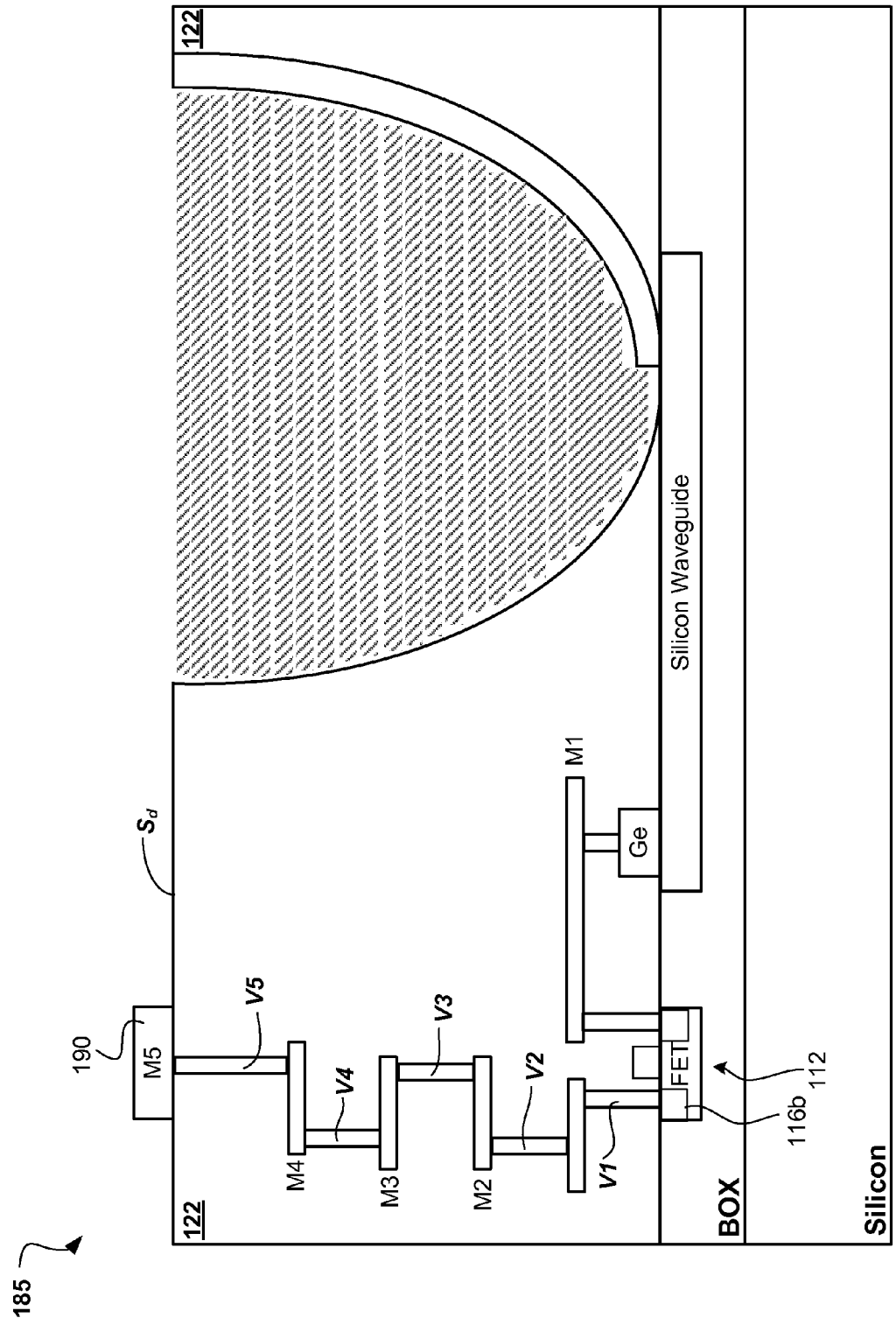

Referring to FIG. 1F, a cross-sectional view of an exemplary embodiment of integrated photonics device 185 is depicted. Integrated photonics device 185 may be formed by creating a metal contact 190 (i.e., metallization layer M5) on the top surface $S_d$ of the dielectric layer 122 of integrated photonics device 180 (FIG. 1E). Contact 190, and other contacts (not shown) within metallization layer M5, may form top layer contacts for creating electrical connectivity to the device packaging (not shown) associated with the integrated photonics device 185. For example, contact 190 is electrically connected to S/D region 116b of FET device 112 by means metallization layers M1-M4 and via connections V1-V5. Contact 190 may then be used for subsequent wire bonding and packaging processes. It may be appreciated that contact 190 may be formed using any known technique. For example, a metal layer (not shown) may be deposited, lithographically pattered using a photoresist layer, and etched in order to create contact 190.

Figure 1G:
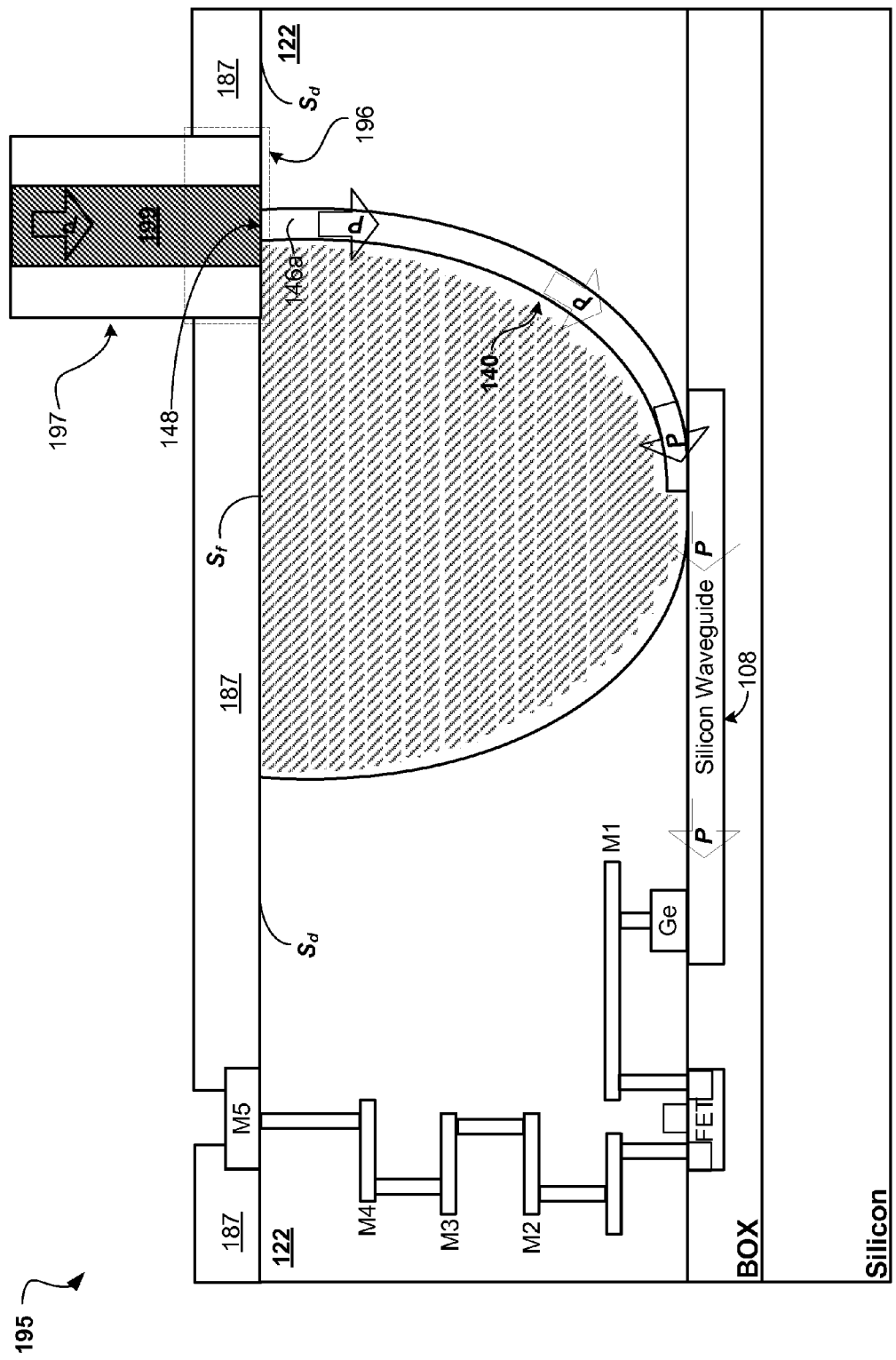

Referring to FIG. 1G, a cross-sectional view of an exemplary embodiment of integrated photonics device 195 is depicted. Integrated photonics device 195 may be formed by creating a passivation layer 187 on the top surface $S_d$ of the dielectric layer 122 of integrated photonics device 185 (FIG. 1F). Passivation layer 187, which, among other things, protects the underlying devices and electrical connectivity, may be formed by depositing and lithographically patterning, for example, a silicon nitride hard mask layer over the top surface $S_d$ of the dielectric layer 122. During the formation of the passivation layer 187, an alignment region 196 may be created within the passivation layer 187 by forming an alignment opening.

As illustrated, the alignment region 196 may facilitate the aligning of an optical fiber 197 with the substantially vertical portion 146a of the optical coupler 140. In particular, the core 199 of the optical fiber 197 is vertically aligned with the end facet 148 of the substantially vertical portion 146a of optical coupler 140. The core 199 of the optical fiber 197 may have a diameter of approximately 1-10 μm. The optical fiber 197 may be directly coupled to the end facet 148 of the substantially vertical portion 146a as a result of the substantially coplanar relationship between the top surface $S_d$ of the dielectric layer 122, the top surface $S_f$ of the fill material 167, and the end facet 148 of the optical coupler 140. Based on this direct coupling, the efficiency of the optical signal transferred from the core 199 of the optical fiber 197 to the end facet 148 of the optical coupler 140 may increase.

As further depicted in FIG. 1G, in operation, an optical signal path may exist as optical signals, as defined by arrows P, are conveyed along an embedded (e.g., within integrated photonic structure 195) optical waveguide structure that may, for example, include optical coupler 140 and silicon waveguide 108. It may be appreciated that although a circular waveguide such as optical fiber 197 is coupled to the optical coupler 140, any other optical waveguide type that may be configured to deliver optical signals to the optical coupler 140 may be contemplated. Moreover, the depicted curved profile of the optical coupler 140 mitigates or eliminates optical power loss that may be experienced as a result of sharp bends in optical waveguide structures. For example, if an optical fiber waveguide is bent beyond a particular radius of curvature, a portion of the propagating optical signal may leak from the region of the bend and, thus, attribute to bend loss. By gradually curving the optical coupler 140 between its substantially vertical and substantially horizontal orientations, bend loss is accordingly minimized or eliminated.

Figure 2:
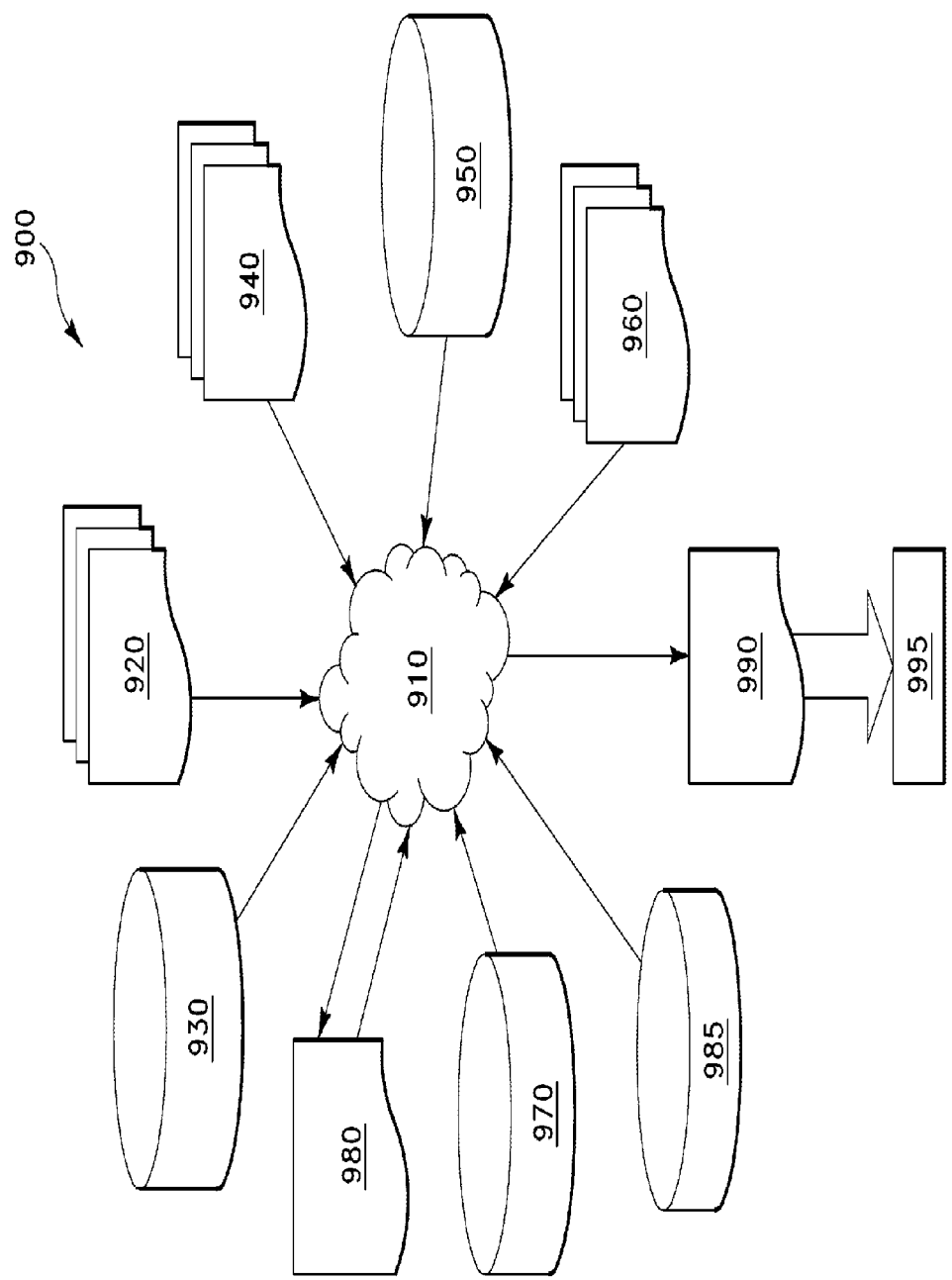
FIG. 2 is a flow diagram of a design process used in semiconductor design, manufacture, and/or test according to an exemplary embodiment.

FIG. 2 shows a block diagram of an exemplary design flow 900 used for example, in semiconductor IC logic design, simulation, test, layout, and manufacture. Design flow 900 includes processes and mechanisms for processing design structures or devices to generate logically or otherwise functionally equivalent representations of the design structures and/or devices described above and shown in FIG. 1G. The design structure processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems.

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 2 illustrates multiple such design structures including an input design structure 920 that is preferably processed by a design process 910. In one embodiment, the design structure 920 comprises design data used in a design process and comprising information describing the embodiments of the invention with respect to the structure as shown in FIG. 1G. The design data in the form of schematics or HDL, a hardware-description language (e.g., Verilog, VHDL, C, etc.) may be embodied on one or more machine readable media. For example, design structure 920 may be a text file, numerical data or a graphical representation of the embodiment of the invention shown in FIG. 1G. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as that shown in FIG. 1G. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structure shown in FIG. 1G to generate a netlist 980 which may contain a design structure such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 20, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990 comprising second design data embodied on a storage medium in a data format used for the exchange of layout data of integrated circuits and/or symbolic data format (e.g. information stored in a GDSII (GDS2), GL1, OASIS, map files, or any other suitable format for storing such design structures). In one embodiment, the second design data resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of the embodiment of the invention shown in FIG. 1G. In one embodiment, design structure 990 may comprise a compiled, executable HDL simulation model that functionally simulates the device shown in FIG. 1G.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 1G. Design structure 990 may then proceed to a stage 995 where, for example, design structure 990: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. An optical waveguide structure, comprising:
a dielectric layer having a top surface;
an optical waveguide structure; and
an optical coupler disposed on the dielectric layer, the optical coupler having both a substantially vertical portion that couples to the top surface of the dielectric layer and a substantially horizontal portion that couples to the optical waveguide structure, the substantially vertical portion and the substantially horizontal portion being separated by a curved portion, wherein the optical coupler tapers in width from the substantially vertical portion to the substantially horizontal portion.

2. The structure of claim 1, further comprising:
an optical fiber having a core for guiding an optical signal, wherein the optical fiber is coupled to the top surface of the dielectric layer such that the core is aligned with the substantially vertical portion of the optical coupler.

3. The structure of claim 1, wherein the optical waveguide structure comprises a silicon waveguide that couples to a photodetector device.

4. The structure of claim 1, wherein the substantially horizontal portion comprises a coupling region corresponding to a location at which the substantially horizontal portion couples to the optical waveguide structure, the coupling region having a length of about 1-10 μm.

5. The structure of claim 1, wherein the optical coupler comprises one of a polycrystalline silicon material having a thickness of about 1000 Å to about 1 μm and a single crystalline silicon material having a thickness of about 1000 Å to about 1 μm.

6. An optical waveguide structure, comprising:
a dielectric layer having a top surface;
an optical waveguide structure; and
an optical coupler disposed on the dielectric layer, the optical coupler having both a substantially vertical portion that couples to the top surface of the dielectric layer and a substantially horizontal portion that couples to the optical waveguide structure, the substantially vertical portion and the substantially horizontal portion being separated by a curved portion, wherein the optical coupler disposed on the dielectric layer comprises a cladding region provided by a dielectric fill material corresponding to the dielectric layer, the dielectric fill material electrically insulating metal connectivity layers within the dielectric layer.

7. The structure of claim 6, wherein the dielectric fill material comprises silicon dioxide ($SiO_2$).

8. The structure of claim 6, wherein the metal connectivity layers comprise:
a plurality of metallic connectors; and
metallic vias for electrically coupling the plurality of metallic connectors.

9. An optical coupler disposed on a dielectric layer formed on a substrate, comprising:
a first waveguide region having a first tapered width and being substantially vertical relative to a top surface of the dielectric layer;
a second waveguide region having a second tapered width and being substantially horizontal relative to the top surface of the dielectric layer; and
a waveguide bend region having a third tapered width and located between the first and the second waveguide region,
wherein the first waveguide region, the second waveguide region, and the waveguide bend region are disposed on the dielectric layer, and wherein the first waveguide region receives an optical signal that is vertically incident relative to the top surface of the dielectric layer, the received optical signal propagating through the first waveguide region to the second waveguide region via the waveguide bend region.

* * * * *